(12) United States Patent
Nair et al.

(10) Patent No.: US 9,565,194 B2
(45) Date of Patent: Feb. 7, 2017

(54) UTILIZING A SOCIAL GRAPH FOR NETWORK ACCESS AND ADMISSION CONTROL

(71) Applicants: Jayakrishnan K. Nair, Bangalore (IN); Simon Hunt, Naples, FL (US); Prasanna Venkateswaran, Nadu (IN)

(72) Inventors: Jayakrishnan K. Nair, Bangalore (IN); Simon Hunt, Naples, FL (US); Prasanna Venkateswaran, Nadu (IN)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/866,788

(22) Filed: Apr. 19, 2013

(65) Prior Publication Data

US 2014/0317676 A1 Oct. 23, 2014

(30) Foreign Application Priority Data

Oct. 19, 2012 (IN) .......................... 4373/CHE/2012

(51) Int. Cl.
*G06F 7/04* (2006.01)
*H04L 29/06* (2006.01)

(52) U.S. Cl.
CPC .................................. *H04L 63/104* (2013.01)

(58) Field of Classification Search
CPC .............................. H04L 63/10; H04L 63/102
USPC ..................................................... 726/26–30
See application file for complete search history.

(56) References Cited

U.S. PATENT DOCUMENTS

| 2006/0021009 | A1 | 1/2006 | Lunt |
| 2006/0248573 | A1* | 11/2006 | Pannu ..................... G06F 21/62 726/1 |
| 2009/0106822 | A1 | 4/2009 | Obasanjo et al. |
| 2010/0180032 | A1 | 7/2010 | Lunt ............................ 709/225 |
| 2012/0204233 | A1 | 8/2012 | Rubio |
| 2013/0166726 | A1* | 6/2013 | Boldyrev ............... G06Q 50/01 709/224 |
| 2013/0332525 | A1* | 12/2013 | Liu ........................ G06Q 50/01 709/204 |

(Continued)

FOREIGN PATENT DOCUMENTS

| EP | 2 466 853 A2 | 6/2012 |
| JP | 2008-507763 A | 3/2008 |

(Continued)

OTHER PUBLICATIONS

Guinard et al., "Sharing using social networks in a composable Web of Things," Pervasive Computing and Communications Workshops (PERCOM Workshops), 2010 8th IEEE International Conference on Year: 2010 pp. 702-707.*

(Continued)

*Primary Examiner* — Roderick Tolentino
(74) *Attorney, Agent, or Firm* — Baker Botts L.L.P.

(57) ABSTRACT

Technologies for providing access control for a network are disclosed. The method may include receiving a request from a user to access a network, receiving a plurality of data associated with the user, the plurality of data comprising a plurality of social data associated with the user's relationship to a social circle, identifying an electronic security policy based at least on the plurality of social data, and authenticating the user to the network if the electronic security policy permits authentication based at least on the plurality of social data.

21 Claims, 2 Drawing Sheets

(56) References Cited

U.S. PATENT DOCUMENTS

| | | | | |
|---|---|---|---|---|
| 2014/0081882 A1* | 3/2014 | Govindaraman | ...... | G06Q 50/01 705/319 |
| 2014/0101248 A1* | 4/2014 | Felder | ...... | H04L 67/22 709/204 |
| 2014/0150072 A1* | 5/2014 | Castro | ...... | G06F 21/31 726/5 |
| 2014/0165178 A1* | 6/2014 | Perrone, II | ...... | H04L 63/0892 726/9 |
| 2014/0259147 A1* | 9/2014 | L'Heureux | ...... | H04L 63/02 726/14 |
| 2015/0312760 A1* | 10/2015 | O'Toole | ...... | H04L 67/02 455/411 |
| 2015/0327038 A1* | 11/2015 | Sooriyan | ...... | H04L 67/22 705/319 |

FOREIGN PATENT DOCUMENTS

| | | | | |
|---|---|---|---|---|
| JP | 2011-504255 A | 2/2011 | | |
| JP | 2013-008345 A | 1/2013 | | |
| JP | 2014-502744 A | 2/2014 | | |
| KR | 2012-0101274 | 9/2012 | ...... | G06Q 50/30 |
| WO | 2009/055241 A2 | 4/2009 | | |
| WO | 2012/080305 A2 | 6/2012 | | |

OTHER PUBLICATIONS

Galpin et al., "Online social networks: Enhancing user trust through effective controls and identity management," 2011 Information Security for South Africa Year: 2011 pp. 1-8.*
International Preliminary Report on Patentability received for PCT Patent Application No. PCT/US2011/054286, mailed on Aug. 22, 2013, 6 pages.
Office Action received for Japanese Patent Application No. 2013-204424, mailed on Aug. 26, 2014, 4 pages of English Translation and 3 pages of Japanese Office Action.
Korean Office Action issued in Appl. No. 10-2013-0116813 with English Translation; 6 pages, Nov. 10, 2015.
Korean Office Action issued in Appl. No. 10-2013-0116813; 8 pages with translation, Jan. 20, 2015.
Korean Office Action issued in Appl. No. 10-2013-0116813; 5 pages, Jul. 1, 2015.

* cited by examiner

UTILIZING A SOCIAL GRAPH FOR NETWORK ACCESS AND ADMISSION CONTROL

RELATED PATENT APPLICATION

This application claims the benefit of Indian Provisional Application No. 4373/CHE/2012, filed Oct. 19, 2012 and entitled "SYSTEM AND METHOD FOR SOCIAL DATA-BASED NETWORK ACCESS."

TECHNICAL FIELD

This invention relates generally to the field of electronic security and more specifically to controlling access to a network through the use of social data.

BACKGROUND

In some local area networks, such as a home network or a business's public wifi network, it has become increasingly important to allow flexibility in which users (and which user devices) may be allowed to join the network in order to minimize electronic security vulnerabilities. Some current methods of allowing guest access to local networks require either no restriction (e.g., for a public wifi system) or maintaining lists of technical details for guest devices. Maintaining lists of the technical specifications of all devices allowed to joint a network may be unwieldy (in the case of a business that wishes to offer its customers a service without having to track machine-specific details), impractical (in the case of a business that wishes to offer its customers a service, it may not be possible to take the time to track all necessary data), or impossible (in the case of a technologically-naïve administrator of a home network who may find the data difficult or impossible to find).

BRIEF SUMMARY OF THE INVENTION

In some embodiments, at least one machine readable storage medium includes computer-executable instructions that are readable by a processor. The instructions, when read and executed, cause the processor to receive a request from a user to access a network and receive data associated with the user. The data includes social data associated with the user's relationship to a social circle. The instructions further cause the processor to identify an electronic security policy based at least on the social data, and authenticate the user to the network if the electronic security policy permits authentication based at least on the social data.

In other embodiments, an electronic security device for providing access control for a network includes a user interface module configured to receive a request from a user to access a network. The data includes social data associated with the user's relationship to a social circle. The device further includes a social data module configured to receive data associated with the user, an electronic security policy engine configured to identify an electronic security policy based at least on the social data, and an authentication module configured to authenticate the user to the network if the electronic security policy permits authentication based at least on the social data.

In yet other embodiments, a method for providing access control for a network includes receiving a request from a user to access a network. The data includes social data associated with the user's relationship to a social circle. The method further includes receiving data associated with the user, identifying an electronic security policy based at least on the social data, and authenticating the user to the network if the electronic security policy permits authentication based at least on the social data.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

As more and more information becomes available online, more users may attempt to access that information in a variety of ways. The network providing users access to the information may have an interest in maintaining security of the data stored within. However, networks must also remain flexible enough to provide irregular or "guest" access to the network. In some situations, regular network security measures may also be insufficient to protect the network from unauthorized access. For example, home networks, when protected, may be poorly protected by passwords. In other situations, a network may be vulnerable to unauthorized access from devices being physically plugged into a network, thereby circumventing normal precautions. In still other situations, an operator of a network may wish to provide "public" or unrestricted guest access while still wishing to maintain some level of security. For example, a retailer may wish to make a wireless network available to its customers, but only to its customers.

One typical method of authenticating access to a network is through media access control ("MAC") address filters. A MAC address is a numeric code assigned to a physical electronic device. However, filtering access based on MAC address may be time consuming and difficult for an inexperienced network operator. For example, determining the MAC address of a particular piece of user equipment may be difficult for someone with little technical expertise. Further, continuously updating a list of authorized MAC addresses may be difficult or impossible for a particular network, whether for reasons of resource limitations (personal or computer) or design considerations (e.g., the desire to make the network available to unknown guests that meet certain criteria).

In some network configurations, frequent addition of computing devices to a private network may be made to enable guest users to access the Internet using a host wired or wireless network. The level of network access that need be provisioned for such guest users may depend on factors such as the relationship and/or trust levels between the guest and the network provider, as well as other parameters like the guest's age, expertise etc. In certain embodiments of the present disclosure, a guest user of a computer network may be generally associated personally, professionally or otherwise with the provider of such a network. For example, the network provider may have a designated "administrative user." The administrative user may have a social graph on social networking platforms that may be mined for information such as those that may automatically determine the nature of network access to be provisioned for a guest user.

Figure 1:
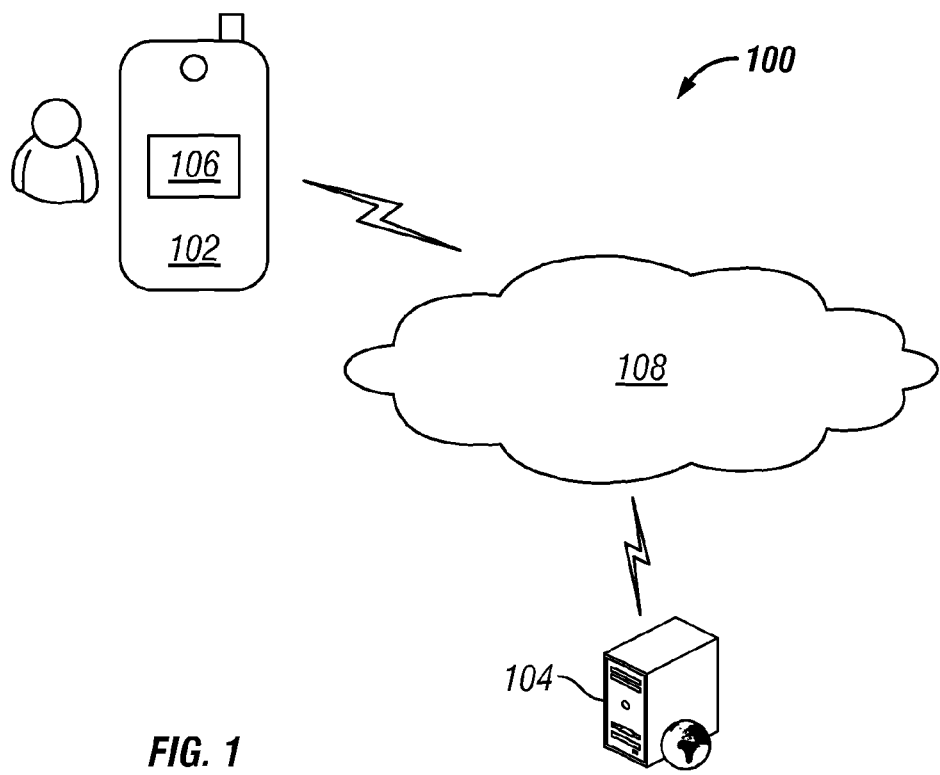
FIG. 1 illustrates an example system for mediating access to network based at least on a set of social data, in accordance with certain embodiments of the present disclosure.

FIG. 1 illustrates an example system 100 for mediating access to network 100 based at least on a set of social data, in accordance with certain embodiments of the present disclosure. System 100 includes user equipment 102, security device 106, social network 104, and network 108.

User equipment 102 may include any suitable electronic mechanism configured to allow a user access to social network 104, such as a module, server, computer, mobile device, system-on-a-chip, other electronic device, or any suitable combination of digital and analog circuitry. In some embodiments, user equipment 102 may include a processor coupled to a memory. User equipment 102 may also include instructions in memory for execution by the processor. In the same or alternative embodiments, the processor and memory may be resident on another electronic device and may execute user equipment 102 as a module. For example, user equipment 102 may include a cellular telephone configured to access the Internet. In the same or alternative embodiments, system 100 may include a plurality of user equipments 102.

As described above, user equipment 102 may include a processor and a computer-readable memory. Program instructions may be used to cause a general-purpose or special-purpose processing system that is programmed with the instructions to perform the operations described above. The operations may be performed by specific hardware components that contain hardwired logic for performing the operations, or by any combination of programmed computer components and custom hardware components. The methods described herein may be provided as a computer program product that may include one or more machine readable media having stored thereon instructions that may be used to program a processing system or other electronic device to perform the methods. The term "machine readable medium" or "computer readable medium" used herein shall include any medium that is capable of storing or encoding a sequence of instructions for execution by the machine and that cause the machine to perform any one of the methods described herein. The term "machine readable medium" shall accordingly include, but not be limited to, memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

The processor may comprise, for example a microprocessor, microcontroller, digital signal processor (DSP), application specific integrated circuit (ASIC), or any other digital or analog circuitry configured to interpret and/or execute program instructions and/or process data. In some embodiments, the processor may interpret and/or execute program instructions and/or process data stored in memory. The memory may be configured in part or whole as application memory, system memory, or both. The memory may include any system, device, or apparatus configured to hold and/or house one or more memory modules. Each memory module may include any system, device or apparatus configured to retain program instructions and/or data for a period of time (e.g., computer-readable storage media). Instructions, logic, or data for user equipment 102 may reside in memory for execution by one or more processors.

The processor(s) may execute one or more code instruction(s) to be executed by the one or more cores of the processor. The processor cores may follow a program sequence of instructions indicated by the code instructions. Each code instruction may be processed by one or more decoders of the processor. The decoder may generate as its output a micro operation such as a fixed width micro operation in a predefined format, or may generate other instructions, microinstructions, or control signals which reflect the original code instruction. The processor(s) may also include register renaming logic and scheduling logic, which generally allocate resources and queue the operation corresponding to the convert instruction for execution. After completion of execution of the operations specified by the code instructions, back end logic within the processor(s) may retire the instruction. In some embodiments, the processor(s) may allow out of order execution but requires in order retirement of instructions. Retirement logic within the processor(s) may take a variety of forms as known to those of skill in the art (e.g., re-order buffers or the like). The processor cores of the processor(s) are thus transformed during execution of the code, at least in terms of the output generated by the decoder, the hardware registers and tables utilized by the register renaming logic, and any registers modified by the execution logic.

In some embodiments, system 100 may also include security device 106. Security device 106 may include any suitable electronic mechanism configured to moderate access to network 108, such as a module, server, computer, mobile device, system-on-a-chip, other electronic device, or any suitable combination of digital and analog circuitry. In some embodiments, security device 106 may include a processor coupled to a memory. Security device 106 may also include instructions in memory for execution by the processor. In the same or alternative embodiments, the processor and memory may be resident on another electronic device and may execute security device 106 as a module. For example, security device 106 may be a stand-alone security device, integrated into a router or gateway, and/or executing on another electronic device.

In some embodiments, security device 106 may include user interface module 110, social data module 112, electronic security policy engine 114, authentication module 116, and/or any other configuration of modules, servers, computers, mobile devices, systems-on-a-chip, other electronic devices, or any other suitable combination of digital and analog circuitry configured to moderate access to network 108. This may include creating, storing, updating, modifying, and/or analyzing one or more security policies to determine whether to grant access to user equipment 102. For example, security device 106 may have a security policy associated with a group of user equipment 102 such as those user equipment 102 belonging to personal associates of the administrative user. In a configuration for a home network, for example, the administrative user may be the home owner. Guest access may be provisioned, via a security policy implemented by security device 106, to personal associates of the home owner. In such configurations, guest access may be authenticated via social network 104. As another example, system 100 may have a group of guest users who may be professional associates of the administrative user. In such a circumstance, security device 106 may include a security policy that allows the guest access to network 108 if the guest user can authenticate the user's identity via social network 104.

In some embodiments, network 108 may include any communications network configured to allow communication access between user equipment 102 and social network 104. For example, network 108 may include any wired (e.g., Ethernet, token ring, etc.), wireless (e.g., 802.11), or other network configured to allow user equipment 102 to communicate with social network 104.

In some embodiments, social network 104 may include a computing device configured to provide access to a social network (e.g., Facebook, LinkedIn, etc.). For example, social network 104 may include a combination of communication paths, servers, databases, and/or any other appropriate combination of computing machinery configured to provide access to a social network. In some embodiments, social network 104 may include a thin client, thick client, web application, web service, web server, or other communication point used to access a social network.

Social network 104 may provide access to certain user data. For example, social network 104 may typically include data connecting a given user with a number of other users. Therefore, it may be possible to construct a "graph" of a user's social circle by assigning each user to a "node" of the graph, and connecting those nodes based on social relationships.

Social network 104 may also provide data particular to each user. For example, social network 104 may provide a user's demographic information (e.g., age, gender, education level) as well as other information that may be useful in certain configurations. For example, social network 104 may provide a user's occupation information, expertise level, geographical location, language, etc.

In some embodiments, user equipment 102 may be communicatively coupled to social network 104 via security device 106 and network 108. For example, user equipment 102 may access social network 104 via a web page over the Internet. As another example, user equipment 102 may access social network 104 via an application installed on user equipment 102. As described in more detail below, a user employing user equipment 102 may allow access to that user's information on social network 104. User equipment 102 may then retrieve the user's data for further processing. In some embodiments, user equipment 102 may then communicate that data to security device 106.

In operation, an operator of security device 106 may wish to allow a set of guest user equipment 102 to access network 108 via security device 106. The operator may accordingly establish one or more security profiles stating the requirements for the set of guest user equipment 102. For example, the security profile may state that the guest user must be part of a specific social graph of the administrative user. In some configurations, for example, a company may allow guest access to users that are connected to the company via the company's social networking platforms. Those users may be part of the administrative user's social graph.

In some embodiments, the security profile may state further detail(s) regarding the social graph requirements. For example, a user requesting guest access to network 108 via security device 106 may be required to be within one degree of the administrative. As another example, a user requesting guest access to network 108 via security device 106 may be required to meet certain additional criteria before being allowed access. The user may be required, for example, to meet certain age, expertise, occupation, and/or experience requirements.

Once configured, security device 106 may be configured to mediate access to network 108. A guest user operating user equipment 102 may request access to network 108 via security device 106. Once user equipment 102 connects to network 108, security device 106 may identify the presence of an unauthorized device attempting to connect. In some embodiments, security device 106 may direct user equipment to a temporary network location. For example, user equipment 102 may connect to a guest portal or other temporary web page.

Security device 106 may then require user equipment 102 to authenticate using an appropriate social network feature. For example, security device 106 may require user equipment 102 to authenticate its user to social network 104. In some embodiments, security device 106 may retrieve certain data from social network 104 via network 108. For example, security device 106 may retrieve data associated with the user of user equipment 102 in order to authenticate whether the user falls within the relevant security profile. In some configurations, for example, security device 106 may authenticate whether the user of user equipment 102 is within a designated social graph (or subset thereof) of the administrative user.

Once the user has performed the authentication routine, security device 106 may apply the data received from social network 104 to one or more security profiles. Based on the data analysis, security device 106 may admit or block access for user equipment 102 to network 108. In some embodiments, the security profile(s) and/or social graph data may be stored on security device 106. In the same or alternative embodiments, some or all of this data may be stored on other computer-readable media on another electronic device located at a location local to or remote from security device 106. In the same or alternative embodiments, data analysis functionality may be split between or among one or more security device(s) 106. In some configurations, for example, network authentication may be performed by one security device 106 while social data analytics may be performed another security device 106. One of ordinary skill in the art may appreciate that other combinations may be appropriate without departing from the scope of the present disclosure.

In some embodiments, security device 106 may be configured to implement a security policy that details access for guest equipment 102 to network 108 in varying levels of detail. For example, one security policy may allow a certain set of guest user equipment 102 unrestricted access to network 108. In some configurations, for example, guest user equipment 102 may be operated by users that may be employed by the network operator. For example, an employee of a company may be operating a piece of user equipment 102 that is not normally recognized by security device 106 (e.g., the employee is attempting to access network 108 via his/her cellular telephone rather than his/her laptop computer). Another security policy may allow a certain set of guest user equipment 102 restricted access to network 108. These restrictions may include access to certain types of data, certain webpages, duration of access, etc.

In the same or alternative embodiments, security device 106 may implement data received from social network 104 in order to create, modify, maintain, implement, or otherwise use one or more security policies. For example, a given social network 104 may allow certain data such as location, groups, events, etc. to be accessed by security device 106. This may allow increased flexibility in determining and/or implementing a given security policy by security device 106. The following examples are provided for illustrative purposes only and are in no way intended to limit the scope of the present disclosure. These examples illustrate the use of security policies by security device 106 in mediating access to network 108.

In a first example, security device 106 may be implemented in a home network. An operator of security device 106 may create a security policy for family members. The family members may be defined as being part of a particular social graph. When a guest attempts to connect to the home network, security device 106 may identify the foreign device and prompt the guest to authenticate via social network 104. Security device 106 may then allow or block access to network 108 based on the authentication with social network 104 and data associated with the social graph.

In a second example, security device 106 may be implemented on a public network run by a business such as a retailer. An operator of security device 106 may create a security policy for customers connected via the business's social media platforms. These customers may be defined as being part of a particular social graph. When a guest attempts to connect to the public network, security device 106 may identify the foreign device and prompt the guest to authenticate via social network 104. Security device 106 may then allow or block access to network 108 based on the authentication with social network 104 and data associated with the social graph.

In a third example, security device 106 may be implemented on a public network available at a particular event. An operator of security device 106 may create a security policy for attendees connected to the event via the organizer's social media platforms. These customers may be defined as being part of a particular social graph. When a guest attempts to connect to the public network, security device 106 may identify the foreign device and prompt the guest to authenticate via social network 104. Security device 106 may then allow or block access to network 108 based on the authentication with social network 104 and data associated with the social graph.

Figure 2:
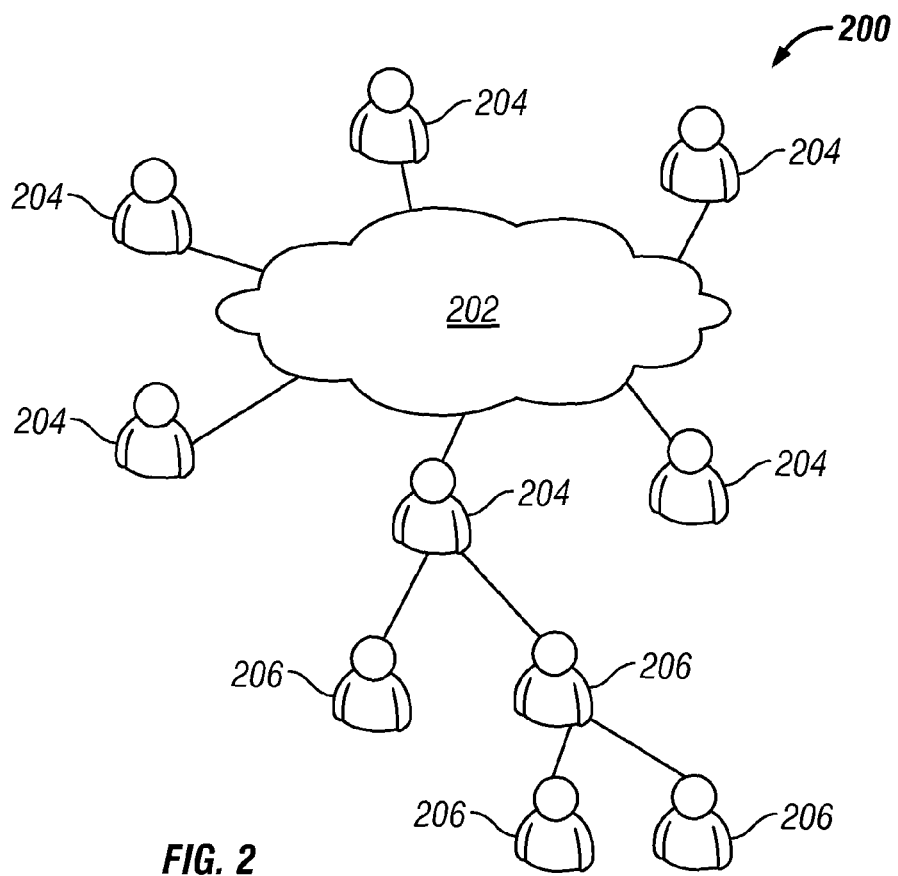
FIG. 2 illustrates an example social graph for use in a network, in accordance with certain embodiments of the present disclosure.

FIG. 2 illustrates an example social graph 200 for use in network 100, in accordance with certain embodiments of the present disclosure. In some embodiments, social graph 200 may include a plurality of users 204-208 connected to a central entity 202. Central entity 202 may be the administrator of network 100. For example, central entity 202 may be one or more family members responsible for operating a home network. As another example, central entity 202 may be a business or other public entity that may have a relationship with the public.

The example social graph 200 illustrates three types of users. For ease of description, these may referred to as first degree users 204, second degree users 206, and third degree users 208. Although social graph 200 illustrates a number of each type of user 204-208, as well as particular relationships, one of ordinary skill in the art would recognize that more, fewer, or different arrangements of the users would be possible without departing from the scope of the present disclosure.

In some embodiments, social graph 200 may include a plurality of first degree users 204. First degree users 204 may be those users with a direct relationship with central entity 202. For example, in the case of a home network, first degree users 204 may be the various devices belonging to family members. As another example, in the case of a public network for use in a business, first degree users 204 may be customers of the business who have opted into a particular relationship (e.g., advertising) with the business.

In some embodiments, social graph 200 may also include a plurality of second degree users 206. Second degree users 206 may be those users without a direct relationship with central entity 202, but with a direct relationship with one or more first degree user(s) 204. For example, in the case of a home network, second degree users 206 may be friends of the various family members. In some embodiments, social graph 200 may include a plurality of third degree users 208. Third degree users 208 may be those users with only a direct relationship to one or more second degree user(s) 206. Depending on the configuration of system 100, more, fewer, and/or different classes of users may be implemented without departing from the scope of the present disclosure.

As described in more detail above with reference to FIG. 1, system 100 may be configured to analyze data associated with social graph 200 in order to implement the appropriate security policy or policies on the appropriate user groups. For example, in the case of a home network, it may be necessary or desirable to prohibit certain behavior from certain types of users. For example, first degree users 204 may be allowed more leeway in the types of network traffic than would a second degree user. As described in more detail above with reference to FIG. 1 and below with reference to FIG. 3, an administrator of network 100 may configure a security device to behave differently, depending on the type of user. In addition to the identities of each type of user, social graph 200 may also include data associated with each user, wherein the data may be used in the identification and/or application of a particular security policy.

Figure 3:
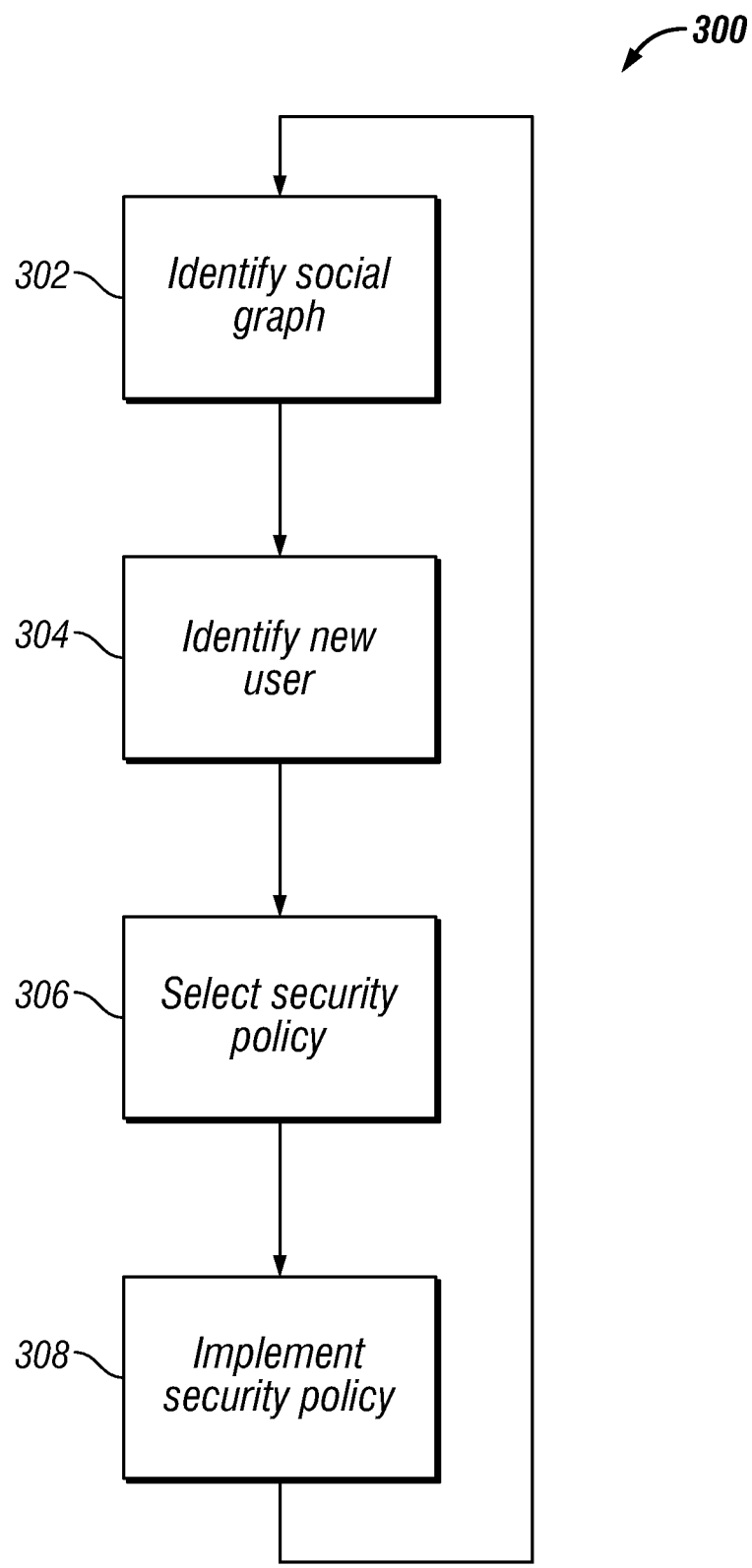
FIG. 3 is a flowchart of an example method for using a social graph in network access and admission control, in accordance with certain embodiments of the present disclosure.

FIG. 3 is a flowchart of an example method 300 for using a social graph in network access and admission control, in accordance with certain embodiments of the present disclosure. Method 300 may include identifying a new user, consulting a social graph in order to classify the new user, selecting a security policy for the new user, and implementing the selected security policy.

According to one embodiment, method 300 preferably begins at block 302. Teachings of the present disclosure may be implemented in a variety of configurations. As such, the preferred initialization point for method 300 and the order of blocks 302-308 comprising method 300 may depend on the implementation chosen.

At block 302, method 300 may identify the appropriate social graph 200 for use with network 100. As described in more detail above with reference to FIGS. 1-2, social graph 200 may based on an appropriate central entity 202, such as the administrator of network 100. In some embodiments, social graph 200 may already exist. In the same or alternative embodiments, social graph 200 may need to be wholly or partially created. In some embodiments, social data module 112 of system 100 may be configured to receive the social data. Once the appropriate social graph 200 is identified, method 300 may proceed to block 304.

At block 304, method 304 may identify a new user requesting access to network 100. As described in more detail above with reference to FIGS. 1-2, the new user may be an entity with a direct relationship, indirect relationship, no relationship with the central entity 202 of social graph 200. For example, the new user may be a new customer that wishes to use a business's public internet connection. Method 300 may place the new user within social graph 200 of central entity 202. In some embodiments, user interface module 110 of system 100 may be configured to receive the request from the user to access the network. Once the new user is identified (as well as its relationship to an appropriate central entity), method 300 may proceed to block 306.

At block 306, method 300 may select one or more security policies to be implemented against the new user, based on the data about the new user and her place within social graph 200. For example, system 100 may require a relatively low level of oversight for family members in a home network while requiring a relatively high level of oversight for non-family members in the home network. In some embodiments, electronic security policy engine 114 of system 100 may be configured to identify the appropriate electronic security policy. After selecting the appropriate security policy, method 300 may proceed to block 308.

At block 308, method 308 implements the selected security policy or policies against the new user. In some embodiments, period (or continuous) monitoring of the user may result in changes to the user's status, the data associated with social graph 200, and/or the traffic being monitored. In some embodiments, authentication module 114 of system 100 may be configured to authenticate the user based on the electronic security policy and the relevant social data. Therefore, in some embodiments, after implementing the selected security policy, method 300 may return to block 302.

Although FIG. 3 discloses a particular number of blocks to be taken with respect to method 300, method 300 may be executed with more or fewer blocks than those depicted in FIG. 3. In addition, although FIG. 3 discloses a certain order of blocks comprising method 300, the blocks comprising method 300 may be completed in any suitable order. For example, method 300 may include blocks necessary to allow (or require) a new user to authenticate herself using a social network. For example, in a configuration wherein social graph 200 may be based on data gleaned from a social network, method 300 may require the new user to authenticate herself using that social network before being able to connect to network 100.

An electronic security device for providing access control for a network is disclosed. The electronic security device may include a user interface module configured to receive a request from a user to access a network; a social data module configured to receive a plurality of data associated with the user, the plurality of data comprising a plurality of social data associated with the user's relationship to a social circle; an electronic security policy engine configured to identify an electronic security policy based at least on the plurality of social data; and an authentication module configured to authenticate the user to the network if the electronic security policy permits authentication based at least on the plurality of social data.

The authentication module may be further configured to require the user to authenticate using a social network from which the plurality of social data was received. The social data module may be further configured to create a social graph, wherein the social graph reflects a plurality of social relationship associated with an administrator of the network. The authentication module is configured to authenticate the user to the network by determining whether the user is within a predetermined relationship to the administrator according to the social graph. The predetermined relationship may include a personal relationship between the user and the administrator. The predetermined relationship may include a geographical relationship between the user and the administrator. The predetermined relationship may include a business relationship between the user and the administrator.

A method for providing access control for a network is disclosed. The method may include receiving a request from a user to access a network; receiving a plurality of data associated with the user, the plurality of data comprising a plurality of social data associated with the user's relationship to a social circle; identifying an electronic security policy based at least on the plurality of social data; and authenticating the user to the network if the electronic security policy permits authentication based at least on the plurality of social data.

The method may also include requiring the user to authenticate using a social network from which the plurality of social data was received. The method may also include comprising creating a social graph, wherein the social graph reflects a plurality of social relationship associated with an administrator of the network. Authenticating the user to the network may include determining whether the user is within a predetermined relationship to the administrator according to the social graph. The predetermined relationship may include a personal relationship between the user and the administrator. The predetermined relationship may include a geographical relationship between the user and the administrator. The predetermined relationship may include a business relationship between the user and the administrator.

What is claimed:

1. At least one non-transitory machine readable storage medium, comprising computer-executable instructions carried on the medium, the instructions readable by a processor, the instructions, when read and executed, for causing the processor to:
   receive a request from a user to access a network;
   receive a plurality of data associated with the user, the plurality of data comprising a plurality of social data associated with the user's relationship to a social circle;
   select an electronic security policy based at least on the plurality of social data; and
   authenticate the user to the network if the electronic security policy permits authentication based at least on the plurality of social data, wherein the instructions to authenticate the user to the network include instructions to authenticate the user, during attendance by the user at an event, based on a connection of the user through the social data to an entity of the network and on a policy for network access for attendees of the event.

2. The medium of claim 1, further comprising computer executable instructions for causing the processor to require the user to authenticate using a social network from which the plurality of social data was received.

3. The medium of claim 1, further comprising computer executable instructions for causing the processor to create a social graph, wherein the social graph reflects a plurality of social relationships associated with an administrator of the network.

4. The medium of claim 2, wherein the computer executable instructions for causing the processor to authenticate the user to the network comprise computer executable instructions for causing the processor to determine whether the user is within a predetermined relationship to the administrator according to a social graph.

5. The medium of claim 4, wherein the predetermined relationship comprises a personal relationship between the user and the administrator.

6. The medium of claim 4, wherein the predetermined relationship comprises a geographical relationship between the user and the administrator.

7. The medium of claim 4, wherein the predetermined relationship comprises a business relationship between the user and the administrator.

8. An electronic security device for providing access control for a network, the electronic security device comprising instructions for execution by a hardware processor, the instructions, when executed by the processor, cause the processor to:

receive a request from a user to access a network;

receive a plurality of data associated with the user, the plurality of data comprising a plurality of social data associated with the user's relationship to a social circle;

select an electronic security policy based at least on the plurality of social data; and authenticate the user to the network if the electronic security policy permits authentication based at least on the plurality of social data, wherein the instructions to authenticate the user to the network include instructions to authenticate the user, during attendance by the user at an event, based on a connection of the user through the social data to an entity of the network and on a policy for network access for attendees of the event.

9. The electronic security device of claim 8, further comprising instructions to cause the processor to require the user to authenticate using a social network from which the plurality of social data was received.

10. The electronic security device of claim 8, further comprising instructions to cause the processor to create a social graph, wherein the social graph reflects a plurality of social relationships associated with an administrator of the network.

11. The electronic security device of claim 10, further comprising instructions to cause the processor to authenticate the user to the network by determining whether the user is within a predetermined relationship to the administrator according to a social graph.

12. The electronic security device of claim 11, wherein the predetermined relationship comprises a personal relationship between the user and the administrator.

13. The electronic security device of claim 11, wherein the predetermined relationship comprises a geographical relationship between the user and the administrator.

14. The electronic security device of claim 11, wherein the predetermined relationship comprises a business relationship between the user and the administrator.

15. A method for providing access control for a network, the method comprising:

receiving a request from a user to access a network;

receiving a plurality of data associated with the user, the plurality of data comprising a plurality of social data associated with the user's relationship to a social circle;

selecting an electronic security policy based at least on the plurality of social data; and authenticating the user to the network if the electronic security policy permits authentication based at least on the plurality of social data, including authenticating the user, during attendance by the user at an event, based on a connection of the user through the social data to an entity of the network and on a policy for network access for attendees of the event.

16. The method of claim 15, further comprising requiring the user to authenticate using a social network from which the plurality of social data was received.

17. The method of claim 15, further comprising creating a social graph, wherein the social graph reflects a plurality of social relationships associated with an administrator of the network.

18. The method of claim 17, wherein authenticating the user to the network comprises determining whether the user is within a predetermined relationship to the administrator according to the social graph.

19. The method of claim 18, wherein the predetermined relationship comprises a personal relationship between the user and the administrator.

20. The method of claim 18, wherein the predetermined relationship comprises a geographical relationship between the user and the administrator.

21. The method of claim 18, wherein the predetermined relationship comprises a business relationship between the user and the administrator.

* * * * *